US009448860B2

(12) United States Patent
Lee et al.

(10) Patent No.: US 9,448,860 B2
(45) Date of Patent: Sep. 20, 2016

(54) METHOD AND ARCHITECTURE FOR PROVIDING DATA-CHANGE ALERTS TO EXTERNAL APPLICATIONS VIA A PUSH SERVICE

(75) Inventors: Wen-Hsin Lee, Issaquah, WA (US); Joseph Harb, Woodinville, WA (US)

(73) Assignee: Oracle America, Inc., Redwood Shores, CA (US)

( * ) Notice: Subject to any disclaimer, the term of this patent is extended or adjusted under 35 U.S.C. 154(b) by 1893 days.

(21) Appl. No.: 10/394,280

(22) Filed: Mar. 21, 2003

(65) Prior Publication Data

US 2004/0186860 A1    Sep. 23, 2004

(51) Int. Cl.
| G06F 15/177 | (2006.01) |
| G06F 9/54 | (2006.01) |
| H04L 29/08 | (2006.01) |
| G06F 3/0484 | (2013.01) |
| G06F 9/44 | (2006.01) |

(52) U.S. Cl.
CPC .............. *G06F 9/542* (2013.01); *H04L 67/26* (2013.01); *G06F 3/04842* (2013.01); *G06F 9/4443* (2013.01)

(58) Field of Classification Search
CPC . H04L 67/26; G06F 3/0484; G06F 3/04842; G06F 9/542
USPC ................................. 715/734–737, 710, 741
See application file for complete search history.

(56) References Cited

U.S. PATENT DOCUMENTS

| 5,819,028 | A * | 10/1998 | Manghirmalani et al. ..... 714/57 |
| 6,055,570 | A * | 4/2000 | Nielsen ............. G06F 17/30899 |
| | | | 707/E17.119 |
| 6,523,038 | B1 * | 2/2003 | Iida et al. ...................... 707/100 |
| 7,107,534 | B1 * | 9/2006 | de Jong et al. ................ 715/734 |
| 7,483,983 | B1 * | 1/2009 | Bonefas et al. .............. 709/226 |
| 7,739,614 | B1 * | 6/2010 | Hackworth .................... 715/771 |
| 2002/0010715 | A1 * | 1/2002 | Chinn et al. .................. 707/514 |
| 2002/0073241 | A1 * | 6/2002 | Gilbert et al. ................ 709/312 |
| 2002/0143813 | A1 * | 10/2002 | Jellum et al. ................. 707/511 |
| 2002/0198946 | A1 * | 12/2002 | Wang et al. .................. 709/206 |
| 2003/0004952 | A1 * | 1/2003 | Nixon et al. .................... 707/10 |
| 2003/0033179 | A1 * | 2/2003 | Katz et al. ........................ 705/7 |
| 2004/0039683 | A1 * | 2/2004 | Mcgeorge ........................ 705/37 |
| 2004/0098459 | A1 * | 5/2004 | Leukert-Knapp et al. ... 709/206 |
| 2004/0139079 | A1 * | 7/2004 | Eryurek et al. .............. 707/100 |
| 2004/0139085 | A1 * | 7/2004 | Eryurek et al. .............. 707/100 |
| 2004/0162879 | A1 * | 8/2004 | Arcuri et al. ................. 709/206 |
| 2004/0225637 | A1 * | 11/2004 | Heinzel et al. .................. 707/1 |
| 2004/0225718 | A1 * | 11/2004 | Heinzel et al. .............. 709/206 |
| 2009/0187819 | A1 * | 7/2009 | Bonefas et al. .............. 715/236 |

* cited by examiner

*Primary Examiner* — Steven Sax
*Assistant Examiner* — Christopher J Fibbi

(57) ABSTRACT

Method and software architecture for providing data-change alerts corresponding to data changes in a data system to external (of the data system) applications. A computer user interface is provided to enable a user to identify user interface (UI) objects corresponding to a user interface of an application used to access the data system to provide data-change alert support for. For example, the UI objects may comprise screens, views, applets, fields, and columns. Based on the alert-enabled UI objects, data-change alert triggers are generated to monitor for data-change events (e.g., inserts, updates, and deletes) that cause changes to data in the data system corresponding to those alert-enabled UI objects. In response to data changes in the data system corresponding to alert-enabled UI objects, appropriate triggers are executed to initiate generation of data-change alerts comprising data values that have been changed. The data-change alerts are then pushed to the external application.

25 Claims, 15 Drawing Sheets

```
<PAGE_TAB
    INACTIVE="N"
    NAME="Siebel Voice Employee Screen"
    SCREEN="Siebel Voice Employee Screen"
    SEQUENCE="6"
    UPDATED="01/16/2002 13:21:49"
    UPDATED_BY="SADMIN"
    CREATED="01/08/2002 11:35:59"
    CREATED_BY="SADMIN">
            <PAGE_TAB_LOCALE
                INACTIVE="N"
                LANGUAGE_CODE="ENU"
                NAME="ENU"
                TEXT="Employees"
                TRANSLATE="Y"
                UPDATED="01/10/2002 11:28:50"
                UPDATED_BY="SADMIN"
                CREATED="01/08/2002 11:36:33"
                CREATED_BY="SADMIN">
            </PAGE_TAB_LOCALE>
</PAGE_TAB>
<PAGE_TAB
```

| Application Representation | | | Subscription Data | |
|---|---|---|---|---|
| View | Applet | Column/Field | UI Reference | Alert Enable |
| ⋮ | | | | |
| Sales Accounts | | | ### | Yes |
| | ⋮ | | | |
| | 176A ⌇ Account List Applet | | ### | Yes |
| | | New | ### | No |
| | | Name | ### | Yes |
| | | Site | ### | No |
| | | Main Phone # | ### | No |
| | | Territories | ### | No |
| | | ⋮ | ⋮ | ⋮ |
| | More Info Account Entry | | ### | Yes |
| | | 194A ⌇ Name | ### | Yes |
| | | 202A ⌇ Main Phone # | ### | No |
| | | 196A ⌇ Address Line 1 | ### | No |
| | | 198A ⌇ Address Line 2 | ### | No |
| | | 200A ⌇ City | ### | Yes |
| | Activities Account Entry | ⋮ | ⋮ | ⋮ |
| | Assets Account Entry | ⋮ | ⋮ | ⋮ |
| | Attachments Account Entry | ⋮ | ⋮ | ⋮ |
| | 224A ⌇ Contacts Account Entry | | ### | Yes |
| | | Personal Title | ### | No |
| | | Last Name | ### | Yes |
| | | First Name | ### | Yes |
| | | Job Title | ### | No |
| | | Phone # | ### | No |
| | | Fax # | ### | No |
| | | Pager Phone # | ### | No |
| | | Street Address 1 | ### | No |
| | | Street Address 2 | ### | No |
| | | State | ### | Yes |
| | | City | ### | Yes |
| | | Postal Code | ### | No |
| | | Country | ### | No |
| | | E-mail Address | ### | No |
| | | Alias | ### | No |
| | | Home Phone # | ### | No |
| | | Division | ### | No |
| | | Employee | ### | No |
| | ⋮ | ⋮ | ⋮ | ⋮ |
| Sales Contacts | | | ### | Yes |
| ⋮ | | | | |

*FIG. 11*

Section Header:

[EAI MSMQ Transport] ~252a

Parameters:

| Key 254a | Value 256a |
|---|---|
| MsmqPhysicalQueueName | private$\jayates1 |
| MsmqQueueMachineName | jsriniva04 |

254b  256b

New Key  New Value

[            ]  [            ]  [Update]

254c  256c

Section Header:

[SMC Alert] ~252b

Parameters:

| Key 254d | Value 256d |
|---|---|
| WorkflowDelete | SMCAlert-Delete.xml |
| WorkflowInsert | SMCAlert-Insert.xml |
| WorkflowOlfValue | SMCAlert-OldFieldValue.xml |
| WorkflowNewValue | SMCAlert-NewFieldValue.xml |

[Update]

New Section Header:

[            ] ~252c

Parameters:

New Key  New Value

[            ]  [            ]  [Update]

[Save Changes]  [Cancel and Go to Subscriptions]  [Close the Application]

METHOD AND ARCHITECTURE FOR PROVIDING DATA-CHANGE ALERTS TO EXTERNAL APPLICATIONS VIA A PUSH SERVICE

FIELD OF THE INVENTION

The present invention relates to data systems in general, and a method and system for providing data alerts to applications external to data systems using a push service in particular.

BACKGROUND INFORMATION

In a typical data system, such as an enterprise data system, a various users operating client machines (i.e., clients) may be concurrently connected to one or more data system application servers to access data in one or more shared databases via corresponding data system "middleware" applications. These client connections may comprise a local area network (LAN) or wide area network (WAN) connection, or a Web-based connection, wherein a Web client may access the data system via the Internet. Generally, the various users of the data system are enabled to access (e.g., read, insert, update, and/or delete) data stored in the database(s) via the middleware applications in connection with appropriate client-side software. The net result is that data in the data system database(s) are constantly changing.

In many instances, the data in the database(s) will be used by more than one data system application. For example, a common set of data hosted by a data system may be used to support a Customer Relationship Management (CRM) application, a Sales application, an Employee Relationship Management (ERM) application, a Human Resources (HR) application, a billing application, etc. Generally, these applications may run in a middleware layer, or may run as an external third-party application that accesses the data in the data system via an application program interface (API) provided by the data system that is designed for such purposes. The effect of sharing a common set of data across applications is that changes made via one of the applications may affect data used by another application. Under this scenario, it may be desired to alert the other application(s) that the data has changed. In other instances in which only a single application provides access to the database (or a particular set of data hosted by the database), changes to the database may changes in which the use of similar alert would be advantageous.

Typically, such alert conditions may be handled at the database level or at the middleware level. For example, most databases used for large-scale data systems provide "trigger" mechanisms that enable predefined operations to be automatically performed in response to a triggering event, such as before insert, update and delete, and after insert, update, and delete triggers common to SQL-based RDBMS databases. Each trigger includes logic and operations defined by corresponding trigger code that are executed in response to the triggering event in a manner similar to executing code in a stored procedure. Typically, the trigger code will be used to automatically modify data in one or more other tables, perform an integrity check of the data being inserted (that can't be handled by the database's built-in integrity check mechanisms), and/or call one or more stored procedures to perform trigger-handling operations. In addition, in some database environments, the trigger and/or stored procedure may invoke a method used by software components external from the database software components, such as a middle- ware application. For example, some database servers allow triggers to invoke Java methods in middleware applications. In this way, the middleware application may be informed of the triggering event directly via the database trigger. In addition, alert conditions may be handled via the middleware application. Since some middleware applications provide an abstracted mechanism for accessing the database, developers of these applications can define triggering events and how they are handled through operations and logic defined by pre-written middleware software code.

Although there are mechanisms for informing middleware applications of triggering events, and defining and handling triggering events via middleware applications, there presently is no efficient mechanism for either enabling developers of external "third-party" applications to define triggering events at the database or middleware level without modifying the database or existing middleware software), or informing the external third-party applications of such triggering events. Since these are external applications are developed by third-party developers (i.e., developers who did not design the middleware data system application), they generally are not allowed direct access to the database schema, which is required to write database triggers, or to the middleware software code. Therefore, there is no way developers of the third-party applications can generate their own triggering events at the database layer or the middleware layer. As a result, in order to determine if various data system data have changed, the third-party application must use a "pull" mechanism, such as a data system query. This is very inefficient, as it causes significant overhead for both the third-party application and the data system.

SUMMARY OF THE INVENTION

A method and corresponding software architecture for providing data-change alerts corresponding to data changes in a data system to external (of the data system) applications. A user interface is provided to enable a user to identify user interface (UI) objects corresponding to a user interface of an application used to access the data system to provide data-change alert support for. For example, the data system user interface corresponds to a user interface that users would use to access data in the data system via a typical computer client (e.g., thin-client, Web-client, etc.) connection to the data system. In one embodiment, the user interface comprises a hierarchy of screens, views, applets (i.e., forms), columns, and fields. Based on the alert-enabled UI objects, data-change alert triggers are generated to monitor for data-change events (e.g., inserts, updates, and deletes) that cause changes to data in the data system corresponding to those alert-enabled UI objects. For example, an update may cause changes to underlying data corresponding to one or more fields on a given applet. In response to such data change-events, appropriate data-change alert triggers are executed to initiate generation of data-change alerts that include data pertaining to the data values that have been changed. The data-change alerts are then pushed to the external application using an outbound service, such as an HTTP service or a messaging queue service.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 8 is a code listing corresponding to an exemplary portion of a repository file from which metadata are extracted to build an application representation of the application user interface;

FIG. 10 is a representation of an exemplary user interface corresponding to a Sales Accounts view provided by an exemplary data system application;

FIG. 11 shows a portion of an application representation that corresponds to the Sales Accounts view of FIG. 12, along with corresponding alert subscription data;

FIG. 14 is a representation of a portion of a computer user interface via which configuration information may be defined.

DETAILED DESCRIPTION OF PREFERRED EMBODIMENTS

A method and distributed software architecture for providing data-change alerts via a push service in response to third-party defined triggering events are described in detail herein. In the following description, numerous specific details are disclosed, such as exemplary software and system architectures, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
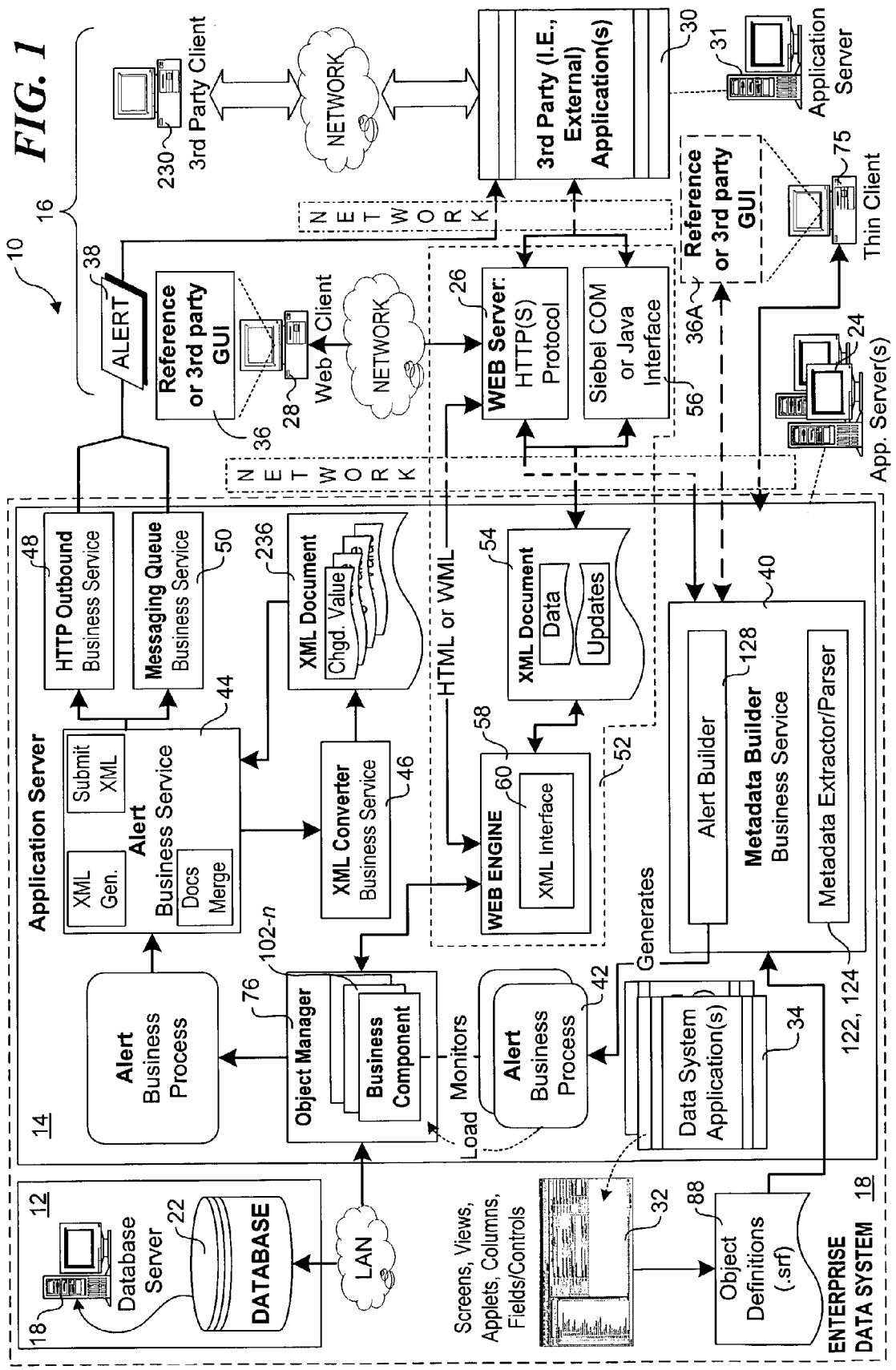
FIG. 1 is a schematic block diagram illustrating a distributed software architecture for providing data-change alerts (corresponding to data changes made to a data system) from the data system to external applications via a push service in accordance with one embodiment of the invention.

A high-level view of a distributed software architecture 10 in accordance with one embodiment of the invention is shown in FIG. 1. As illustrated, the architecture comprises a well-known n-tier configuration, including a database tier or layer 12, an application server tier or layer 14 (also known as the middleware tier or layer), and a client tier or layer 16. Collectively, the various software and hardware components corresponding to database tier 12 and application server tier 14 comprise an enterprise data system 18.

In general, the software components corresponding to each tier will be run by one or more separate machines corresponding to that tier. For example, database server software running on a database server 20 is used to host a database 22 that contains various data stored by enterprise data system 18. Similarly, various application software components and modules corresponding to application server tier 14 are run on one or more application servers 24. In one embodiment, the n-tier architecture further includes a Web server tier 26 that enables Web clients 28 to access enterprise data system 18.

In accordance with an aspect of the invention, software components corresponding to application server tier 14 enable developers of external third-party applications 30 to select various user interface (UI) objects 32 pertaining to one or more data system applications 34 running in application layer 14 to "alert-enable" via a reference or third-party graphical user interface (GUI) 36. The software components are used to automatically generate data-change alert triggers corresponding to the alert-enabled UI objects (embodied as alert business processes), and generate data-change alerts 38 that are pushed (i.e., automatically sent) to third party applications 30 in response to any database access events that cause the data-change alert triggers to be triggered. These software components include a metadata builder 40, alert business processes 42, an alert business service 44, an XML converter 46, an HTTP outbound business service 48 and a messaging queue business service 50.

In accordance with one embodiment of the architecture, third-party applications 30 running on an application server 31 are enabled to submit data to and receive data from enterprise data system 18 via a "mobile connector" application program interface (API) 52. In general, various types of API's may be employed in addition to the mobile connector API described herein. Under the mobile connector API, incoming and outgoing data are sent as extended markup language (XML) documents over (generally) over an applicable network(s) via Web server 26 using the HTTP (hypertext transport protocol) or the HTTPS (HTTP secured) protocol, or via a Siebel® COM (component object model) or Java interface 56. On the application server side, a Web engine 58 including an XML interface 60 enables access to database 22 via an object manager 76, as described below in further detail.

Typically, the enterprise data system will provide various means to access the data that it stores, such as client connections, as will be understood by those skilled in the database/data system arts. Ideally, it is desired to enable third-party applications access to the enterprise data system in a manner that is substantially transparent to the data system. In one embodiment, each connection provided by the mobile connector appears to the enterprise data system as a "normal" client connection, and as such, does not require any changes to the core software components that support the enterprise data system.

Figure 2:
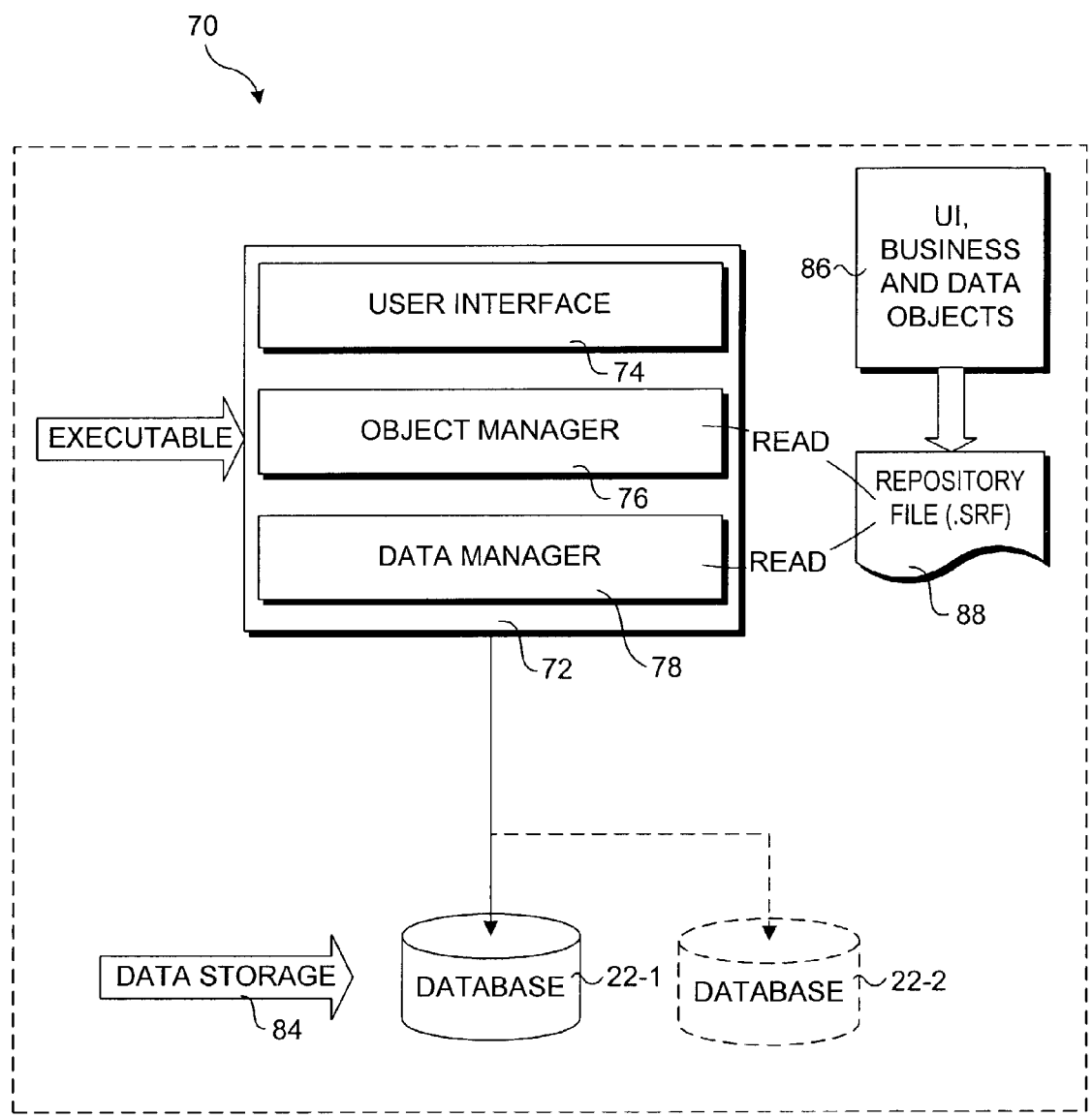
FIG. 2 is a block schematic diagram illustrating a multi-layer software architecture used by an embodiment of the data system shown in FIG. 1.

In one embodiment, software corresponding to core software components that control normal operations of enterprise data system 18 (i.e., operations involving interaction with the enterprise data system) can be logically structured as a multi-layered architecture 70, as shown in FIG. 2. In one embodiment, the logical multi-layered architecture provides a platform for common services 72 to support various applications that implement the architecture. These services may be logically partitioned into a user interface layer 74, an object manager layer 76, and a data manager layer 78.

In one embodiment, user interface layer 74 provides the screens, views, and applets that make up various user interfaces that are rendered on client machines that connect to the enterprise data system via a computer-network-based client connection to enable users of those client machines to interact with the enterprise data system. Generally, user interface layer 74 may be configured to support various types of clients, including traditional connected clients, remote clients, thin clients over an Intranet, Java thin clients on non-Windows-based operating systems, and Web clients over the Internet, etc. These clients are collectively represented as thin client 75 in the figures herein.

Object manager layer 76 is designed to manage one or more sets of business rules or business concepts associated with one or more applications and to provide the interface between user interface layer 74 and data manager layer 78. In one embodiment, the business rules or concepts can be represented as business objects. In one embodiment, the business objects may be designed as configurable software representations of the various business rules or concepts applicable to the data services provided by embodiments of the invention, as explained below in further detail.

Data manager layer 78 is designed to maintain logical views of underlying data stored in one or more databases 22-n (e.g., database 22) corresponding to a data storage layer 84, while allowing the object manager to function independently of the underlying data structures or tables in which data are stored. In one embodiment, the data manager provides certain database query functions, such as generation of structure query language (SQL) in real time to access the data. In one embodiment, data manager 88 is designed to operate on object definitions 86 stored in a repository file 88 corresponding to a database schema used to implement the data model for the system, as described in further detail below. Generally, the data manager layer is designed to handle the interactions with one or more specific target databases and provide the interface between the data manager and those databases, via either generic (e.g., Open Database Connectivity (ODBC)) or native (e.g., OCI) database interface protocols.

Figure 3:
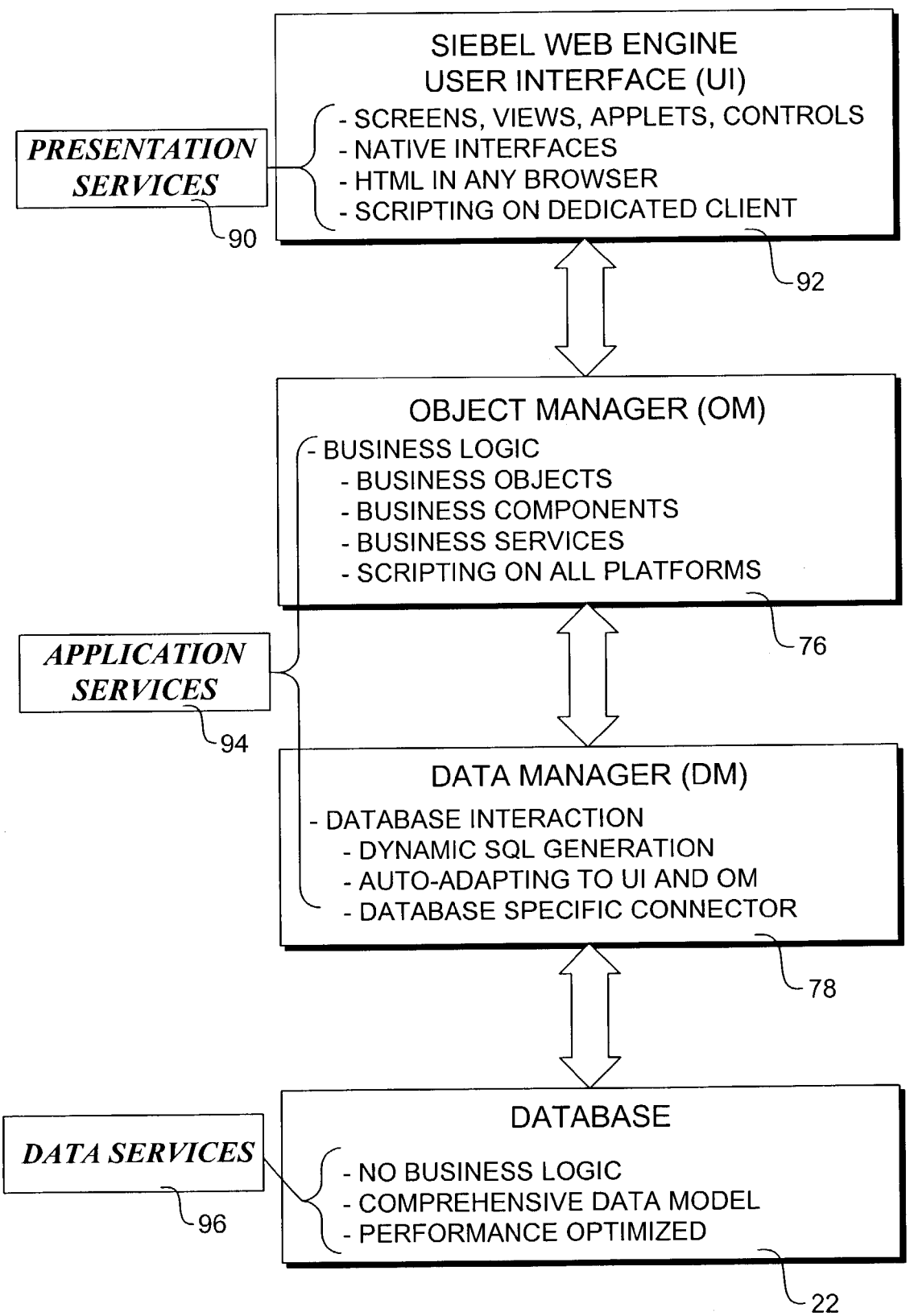
FIG. 3 is a block schematic diagram illustrating further details of the multi-layer software architecture of FIG. 2.

FIG. 3 shows a block diagram illustrating another logical representation of a multi-layered architecture corresponding to the core operations of the enterprise data system. Again, the multi-layered architecture as illustrated in FIG. 3 provides the platform for various common services designed and configured to support the various core operations provided by the enterprise data system. In one embodiment, these various services include a presentation services layer 90 corresponding to services provided by an applet manager and user interface 92, an application services layer 94 corresponding to services provided by object manager layer 76 and data manager layer 78, and a data services layer 76 corresponding to services provided by database 22.

In one embodiment, presentation services 90 may be designed and configured to support various types of clients and may provide them with user interface screens, views and applets. In one embodiment, application services 94 may include business logic services and database interaction services. In one embodiment, business logic services provide the class and behaviors of business objects and business components implemented by the application services. In one embodiment, database interaction services may be designed and configured to take the user interface (UI) request for data from a business component and generate the appropriate database commands (e.g., SQL queries, etc.) to satisfy the request. For example, the data interaction services may be used to translate a call for data into RDBMS-specific SQL statements.

Figure 4:
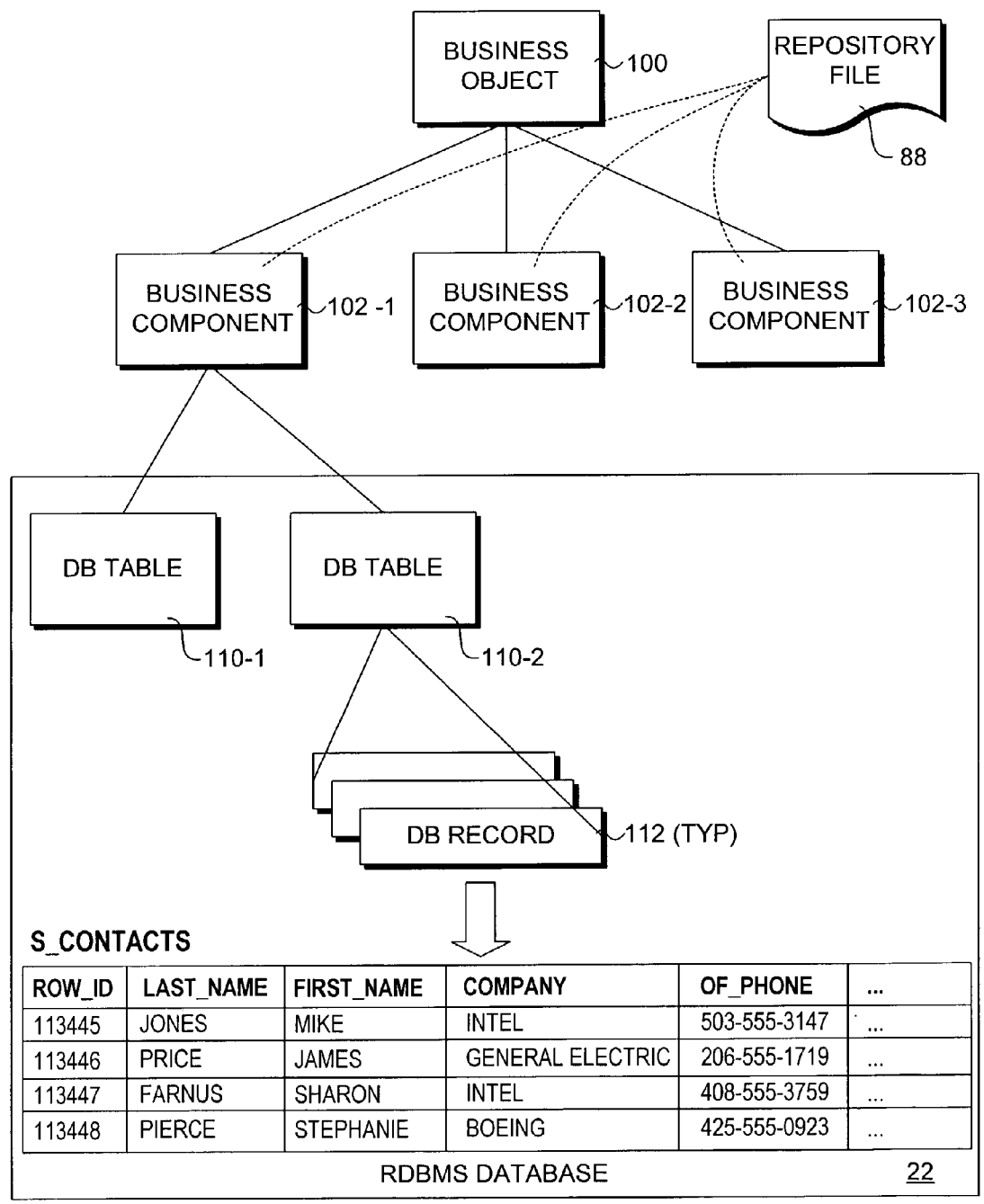
FIG. 4 is a block schematic diagram illustrating further details of various object manager objects in accordance with the multi-layer software architecture.

A multi-layer architecture illustrating the relationships between business objects, business components, and database tables is shown in FIG. 4. A business object 100 sitting at the top layer passes various data access requests to business components 102-1, 102-2, and 102-3 to retrieve data pertaining to the business object from a database 22. For example, business object 100 may pertain to a contact object and business components 102-1, 102-2, and 102-3 are used to access data in a database 22 pertaining to contacts.

In one aspect, business components are objects that span data from one or more physical database tables and calculated values by referencing a base table and explicitly joining and linking other tables, including intersection tables, as depicted by tables 110-1 and 110-2, each of which include a plurality of records 112. Each business component contains information for mapping to various data stored in those tables. More specifically, these mappings are between a requested object, such as a subject, and information pertaining to that object that are stored in the database table(s) to which the business component corresponds. In one embodiment, database schema information stored in repository file 88 is used by the business components in determining their table mappings.

Figure 5:
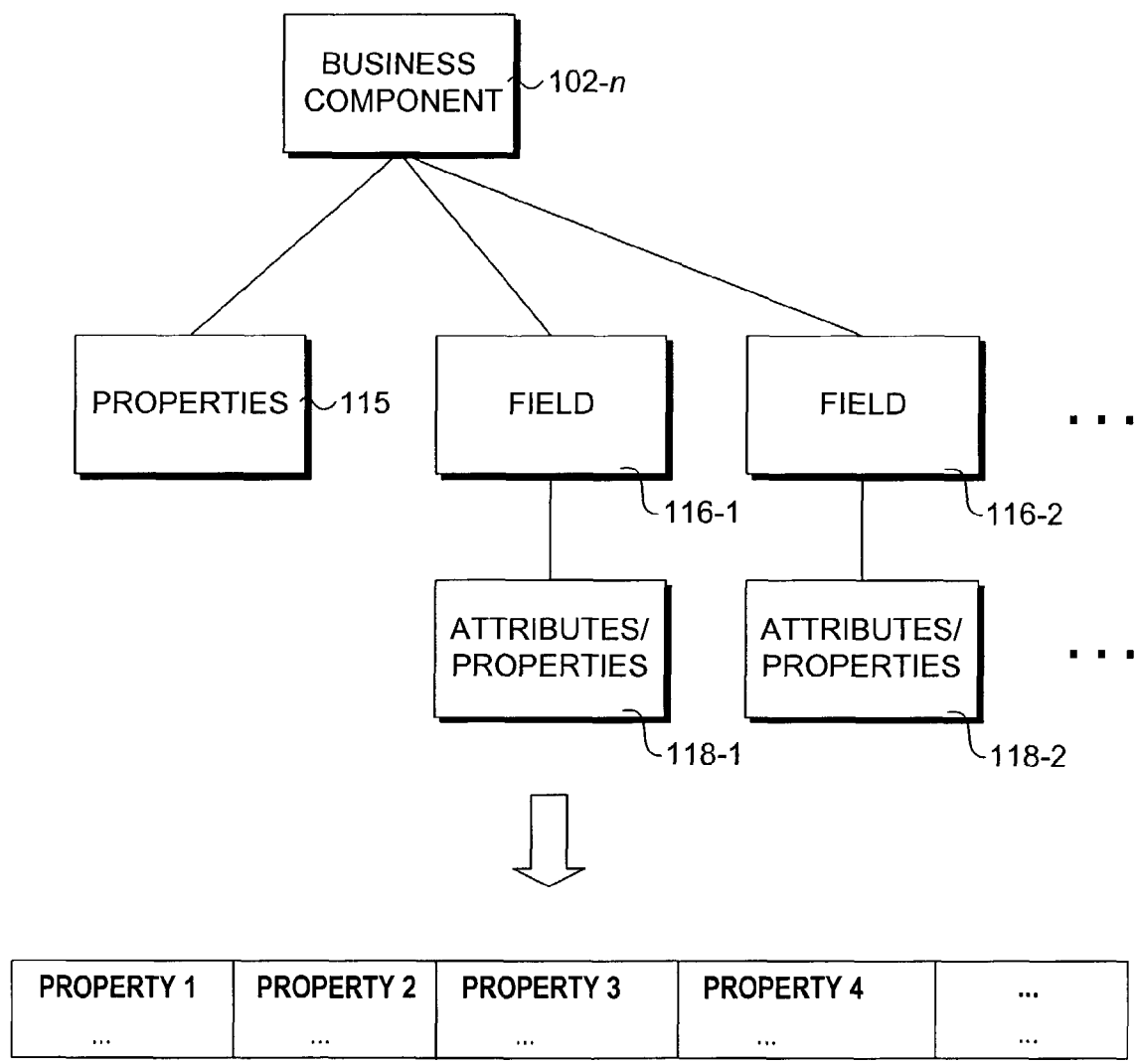
FIG. 5 is a block schematic diagram illustrating further details of a business component as used in the multi-layer software architecture.

A block diagram of a logical structure of a business component in accordance with one embodiment of the present invention is shown in FIG. 5. Each business component (e.g., 102-1, 102-2, and 102-3) may include a set of properties 115 that pertain to the respective business component (e.g., NAME, which specifies the logical name of the business component, TABLE NAME, which specifies the actual name of the underlying table, etc.). A business component also includes a set of fields 116, each of which may have a set of associated attributes or properties 118. For example, a field may include a NAME property that identifies the name of the field, a COLUMN NAME property that identifies the column of the underlying table to which the respective field is mapped, etc.

Figure 6:
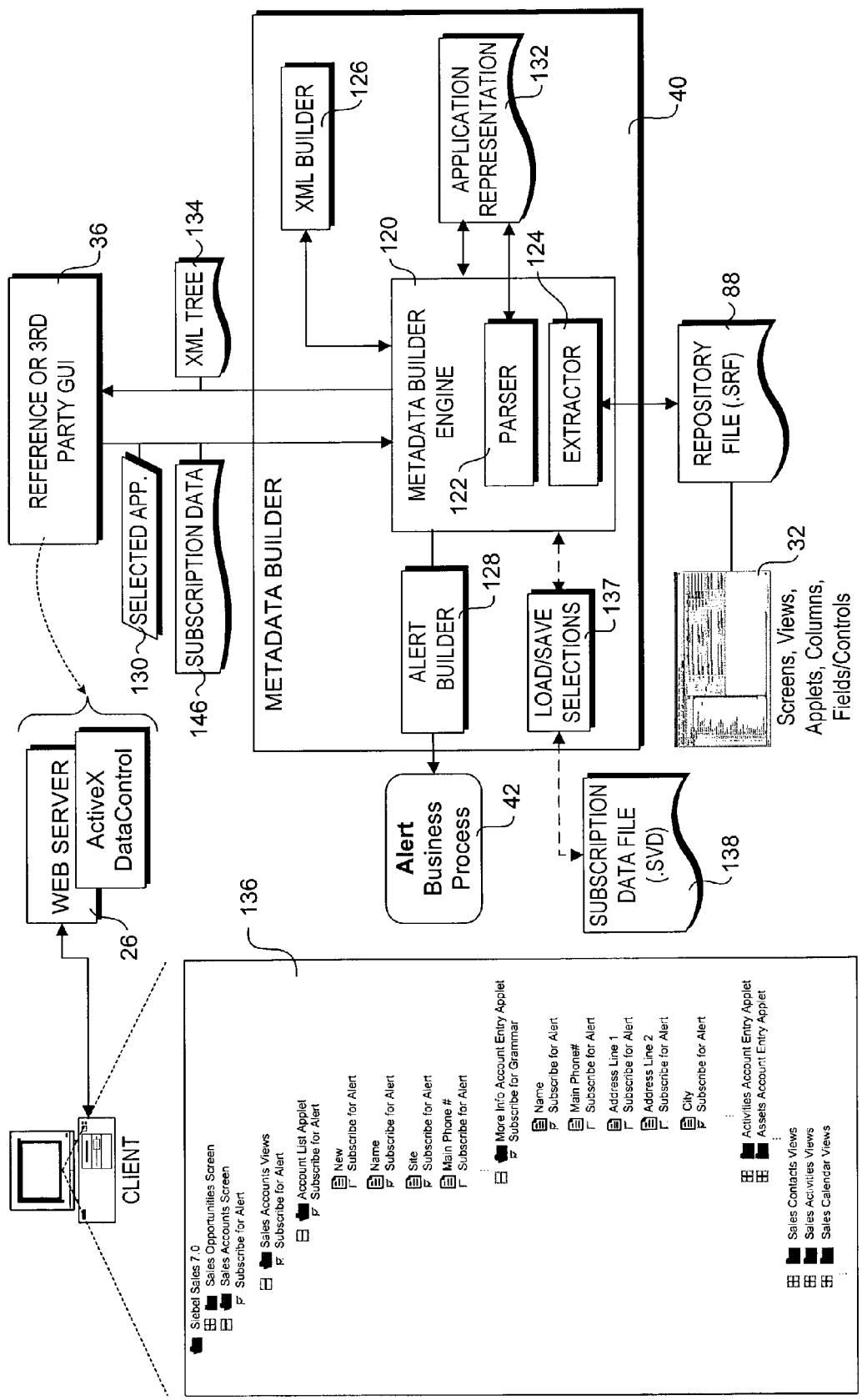
FIG. 6 is a block schematic diagram illustrating details of a metadata builder component in accordance with one embodiment of the invention that is used to generate a computer user interface by which a user is enabled to select user interface (UI) objects of a data system application user interface to alert-enable.

The reference or third-party GUI 36 in combination with metadata builder 40 enables third party developer or administrators to select which screens, views, applets, columns, and controls/fields to request alert service subscription for. Further details of metadata builder 40 are shown in FIG. 6. At the core of the metadata builder is a metadata builder engine 120, which includes a parser 122, and an extractor 124. Additional components include an XML builder 126 and an alert builder 128. In one embodiment, metadata builder 40 may be implemented as a business service that is managed by object manager 76.

Figure 7:
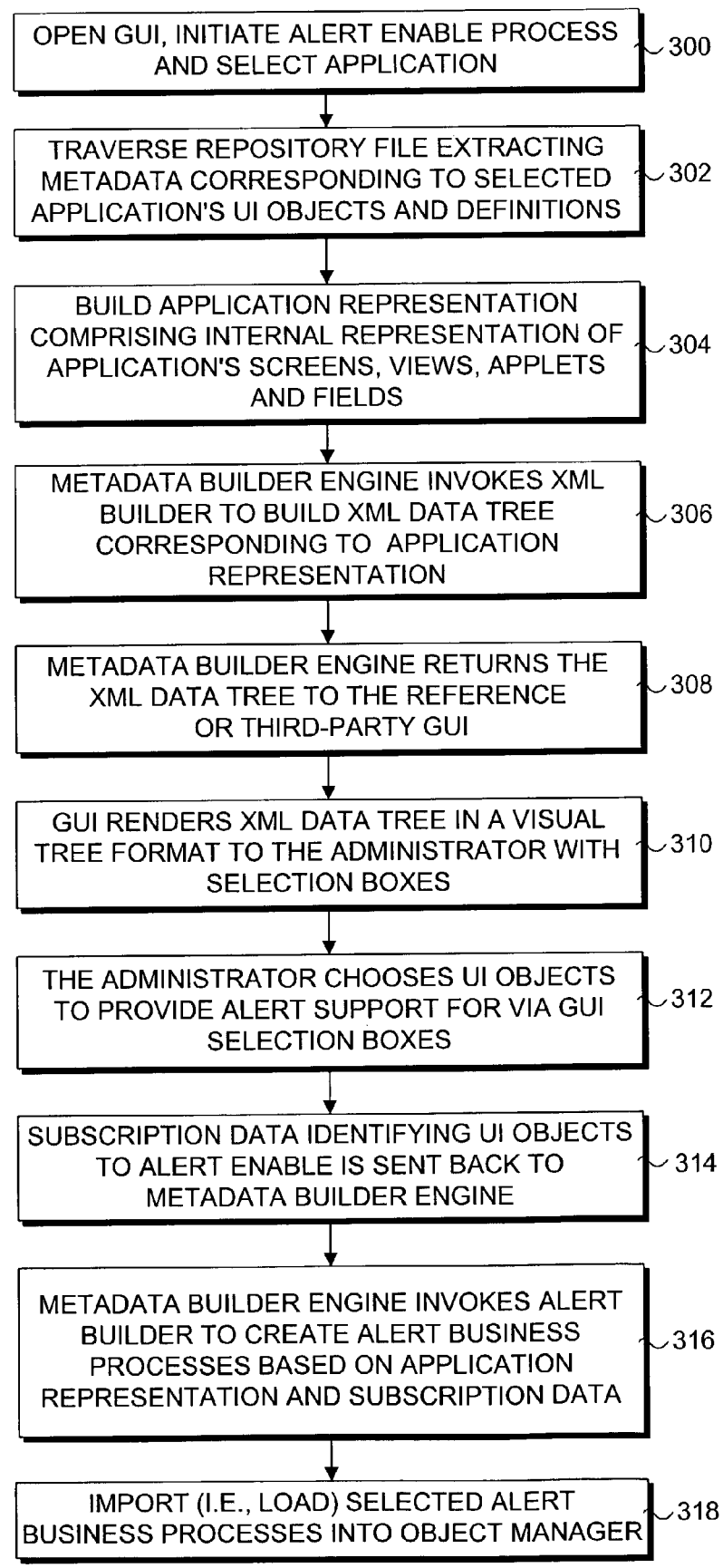
FIG. 7 is a flowchart illustrating the operations and logic performed by one embodiment of the invention when generating data pertaining to the computer user interface and generating data-change alert triggers (comprising alert business processes)

With reference to FIG. 7, the process for selecting which UI objects to alert-enable and for generating corresponding alert business processes begins in a block 300 in which the third-party user (e.g., an administrator) opens reference or third-party GUI 36, initiates the alert-enable process, and selects an application the administrator would like to provide data-change alert support for. Generally, the administrator will be presented with a user interface such as a dialog box or web page (both not shown) that enables the user to select an application to alert-enable from among one or more data system applications 34 that are supported by the enterprise data system.

Upon selection of the application, selection data 130 identifying the selected application is passed to metadata builder engine 120, which then invokes extractor 124 to traverse repository file 88 and extract metadata corresponding to the selected application's UI objects and definitions in a block 302. As described above, the repository file contains object definitions for the various objects corresponding to all of the applications in the enterprise data system, stored as metadata in a compiled format. Included in these object definitions are user interface object definitions and their relationships. An exemplary portion of a repository file is shown in FIG. 8. (It is noted that in one embodiment the repository file is actually stored in a compiled format rather than the ASCII text format shown in FIG. 8, which is used in the figure for clarity.)

Figure 9:
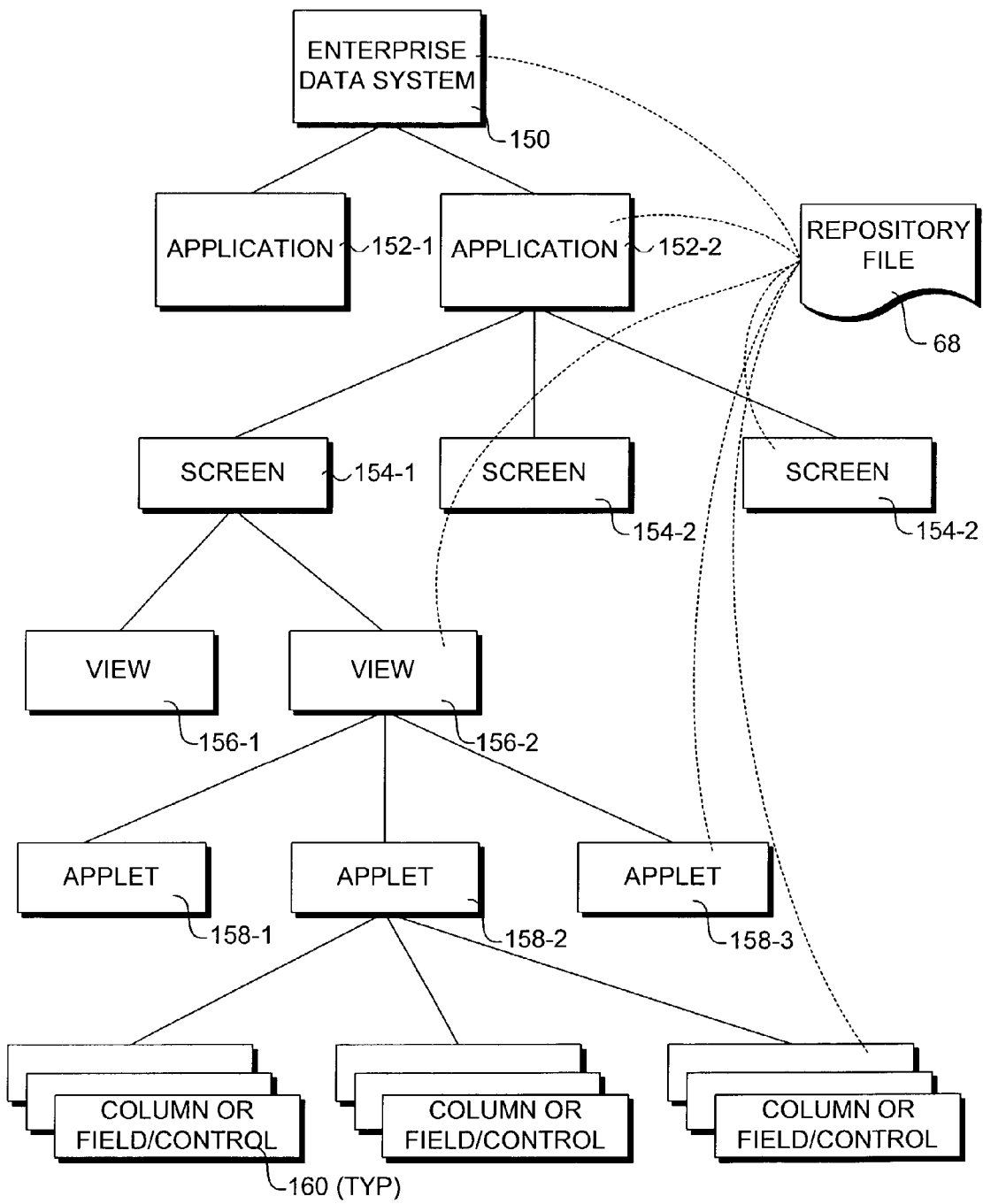
FIG. 9 is a block diagram illustrating the user interface (UI) hierarchy of a user interface that enables access to an enterprise data system in accordance with one embodiment of the invention.

In one embodiment, the user interface objects have a hierarchical relationship, as shown in FIG. 9, wherein the top level of the hierarchy corresponds to the entire enterprise data system, as depicted by an enterprise data system block 150. Each enterprise data system will include one or more applications 152, with each application 152 including a plurality of screen 154. In turn, each screen will include one or more views 156, with each view including one or more applets 158. Finally, each applet will include a plurality of columns and/or fields/controls 160, with each column corresponding to column in a list applet each field/control typically comprising an edit control on an entry applet (i.e., detail form) that is either mapped to a column in a database table or a list of values that are either predefined, or generated at run-time based on current data in the enterprise data system.

Figure 10:
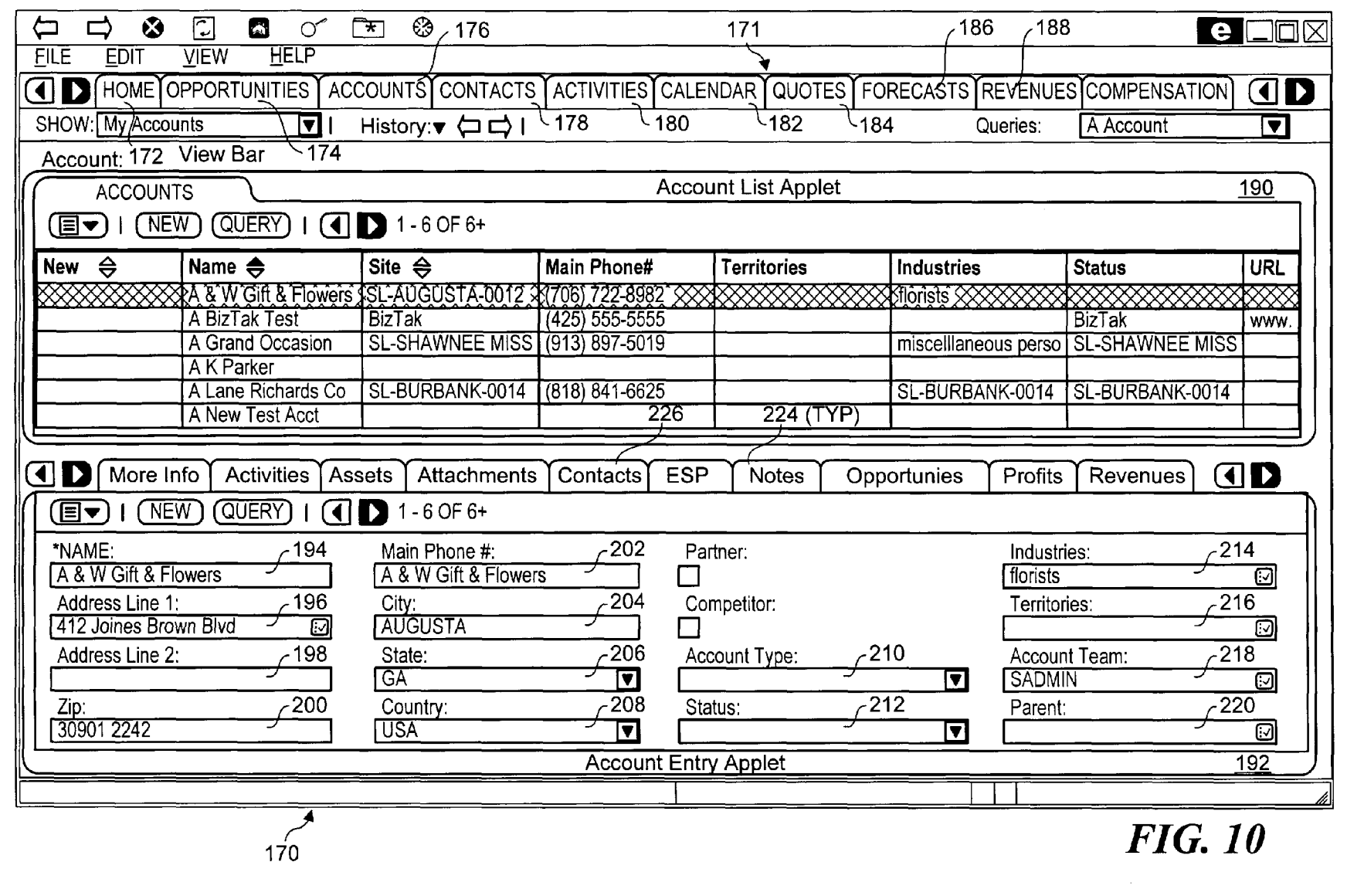

A rendered user interface 170 that graphically depicts the UI object hierarchy of FIG. 9 is shown in FIG. 10. User interface 170 includes a screen bar 171 corresponding to screens 154 that enable a user to select a screen the user desires to view. For example, in the illustrated user interface these screens include a "Home" screen 172, an "Opportunities" screen 174, and "Accounts" screen 176, a "Contacts" screen 178, an "Activities" Screen 180, a "Calendar" screen 182, a "Quotes" screen 184, a "Forecasts" screen 186, and a "Revenues" Screen 188. Activation of the tab having the screen name causes the application to render the selected screen and navigate the user to the application "domain" corresponding to the selected screen.

As discussed above, each screen includes one or more applets. Under common user interface terminology, applets would generally fall into the "form" category. Applets generally have two formats: list applets and form or detail applets. A list applet contains a tabular list of data including multiple rows and data columns similar to that shown in an Account list applet 190. A form or detail applet typically includes a plurality of fields containing data pertaining to a particular "record," wherein the record will often correspond to a selected row in an accompanying list applet. For example, an Account entry applet 192 includes a "Name" field 194, and "Address Line 1" field 196, and "Address Line 2" field 198, a "Zip" field 200, a "Main Phone #" field 202, a "City" field 204, a "State" field 206, a "County" field 208, an "Account Type" filed 210, a "Status" filed 212, an "Industries" field 214, a "Territories" field 216, and "Account Team" field 218 and a "Parent" field 220. Generally, each field will have a corresponding edit control, which typically will comprise an edit box or a dropdown control from which a user may select from a predetermined list of values. In some instances, a dialog picklist control 222 may also be provided that enables a user to select from list of options via a dialog box that is populated with the list using a run-time query.

In many instances, applets may be linked via a parent-child type relationship. For example, Account list applet 190 is a parent of Account entry applet 192, which includes a plurality of tabs 224 to enable a user to enter or view information specific to the name on each tab and the currently selected account record. For example, the currently selected account is "A & W Gifts and Flowers," and a user could enter information concerning contacts for this account by activating a "Contacts" tab 226, which would bring up a Contacts form including a plurality of fields pertaining to contact information (not shown).

Returning to the flowchart of FIG. 7, in a block 304 parser 122 builds an application representation comprising an internal representation of the selected application's screens, views, applets, columns, and fields/controls based on the corresponding user interface object definition metadata that were extracted in block 302, as depicted by application representation 132. In one embodiment, the application representation comprises a hierarchical tree structure of the object definitions extracted by the extractor. In exemplary application representation occupies the left-hand portion of FIG. 11. Each node in the hierarchical tree stores data corresponding to a respective application representation object. The respective object may be an application object, screen object, view object, applet object, etc. Nodes corresponding to various UI objects in FIG. 10 share the same root reference number in both FIGS. 10 and 11, wherein an appended "A" is added to the reference number in FIG. 11. After getting the object definition from the extractor, the parser will convert the object to an application representation object and store it in a node of the hierarchical tree structure. This is repeated for all objects until the tree is filled.

Next, in a block 306 metadata builder engine 120 invokes XML builder 126 to build an XML data tree 134 corresponding to application representation 132, and returns the XML data tree to reference or third-party GUI 36 in a block 308. To perform this operation, the XML builder traverses the hierarchical tree and builds an XML representation for it. The reference or third-party GUI parses the XML data tree and renders a selection tree 136 in a window or frame similar to that shown in FIG. 12. In general, the selection tree will have a hierarchy similar to the user interface hierarchy of the application, as defined by application representation 132.

The reason for using the name "reference or third-party" GUI is that the GUI can either be a GUI supplied by the data system vendor (the "reference" GUI), or a customized GUI developed by the third party. In one embodiment, the reference GUI comprises a plurality of ASP (Active Server Page) web pages that use an ActiveX data control to get access to the metadata builder. In this embodiment, the ASP creates the ActiveX control, gains access to the metadata builder, starts the XML extraction to get the XML object definition, renders the HTML for the reference GUI, returns subscription XML data for UI components to provide data-change alert support for, triggers the creation of alert business processes, and allows loading and saving existing subscriptions, as depicted by a block 137 and subscription data document 138. In one embodiment, the ActiveX Data-Control is used to create selection tree 136, wherein the ActiveX DataControl enables the window to have functionality similar to the Microsoft Windows Explorer file management tool. For example, objects corresponding to screens, views and applets are displayed with adjacent file icons, including open file icons 140 and closed file icons 141, while column and field/control objects are displayed with adjacent document icons 142. Additionally, activation of an expansion control 143 causes data pertaining to a closed folder to be expanded, while activating a collapse control 144 causes data corresponding to an opened folder to be collapsed (i.e., removed from view).

Figure 12:
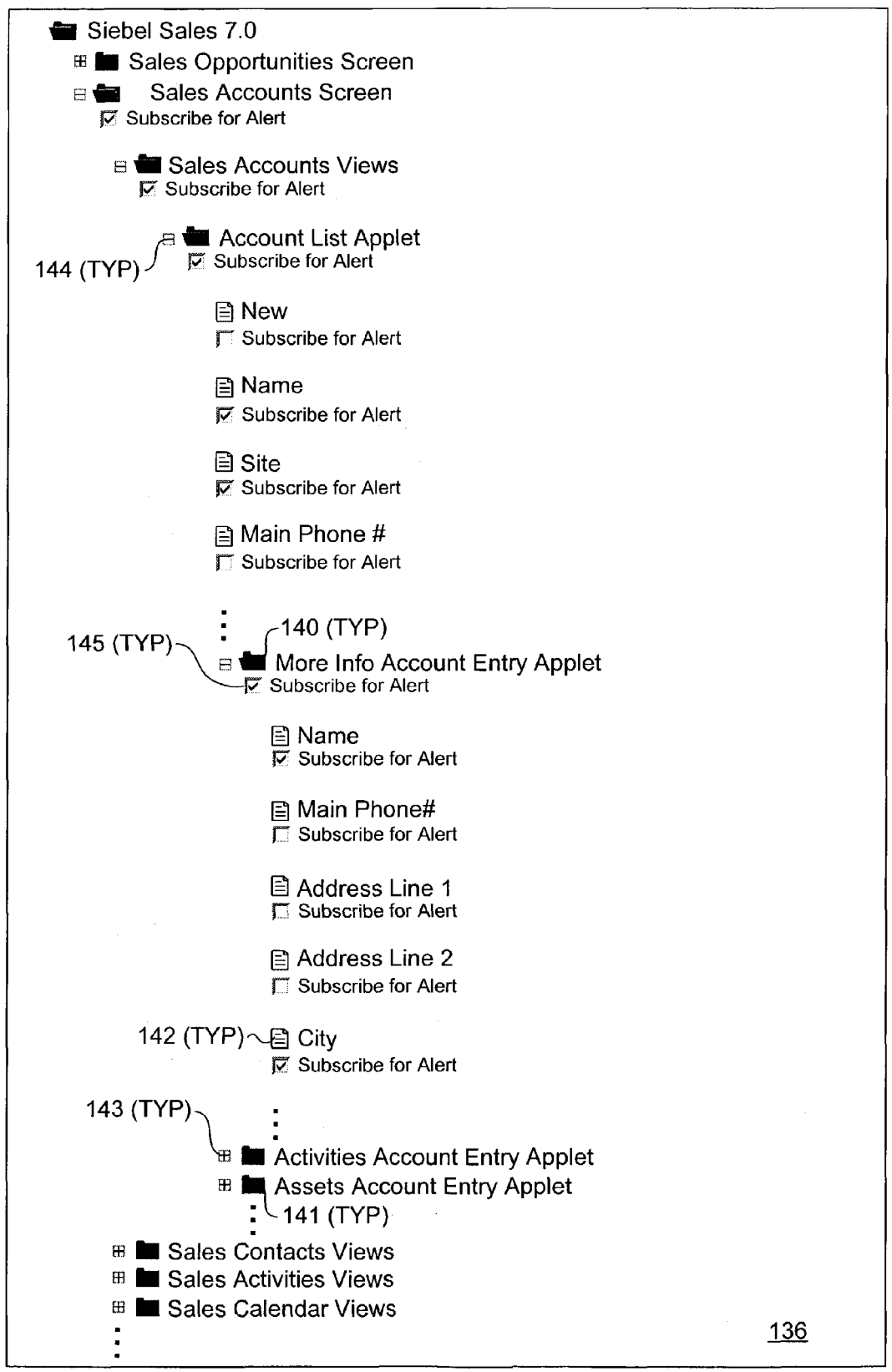
FIG. 12 is a representation of a graphical user interface window that enables an administrator to select UI objects to provide data-change alert support for that is produced in accordance with the flowchart of FIG. 7 and the software architecture of FIG. 6.

As shown in FIG. 12, a "Subscribe for Alert" checkbox 145 is displayed below each opened screen, view, applet, and column/field/control object. Accordingly, in a block 312, the administrator selects appropriate checkboxes to identify which views, applets, and columns/fields/controls the administrator would like to provide data-change alert support for. Subscription data 146 pertaining to the selected UI objects and checked options are then submitted back to metadata builder engine 120 in a block 314 along with a request to provide data-change alert support for the selected UI objects. An exemplary set of subscription data is shown in the right-hand portion of FIG. 11.

In cases in which a customized third-party GUI is used, data pertaining to XML tree 134 will be extracted to build the GUI. Preferably, the third-party GUI will present the user with selectable indicia corresponding to respective UI objects in a manner similar to that described above for the reference GUI. Furthermore, the third-party GUI also needs to generate subscription data compatible with subscription data 146.

In addition to the Web-based reference or third party GUI, a GUI with similar features and operations may be presented to users that are connected to the data system via a dedicated or thin-client connection. For example, such a GUI may be generated using common development languages, such as C++ or Java. This optional GUI is depicted in FIG. 1 as reference or third party GUI 36A.

In a block 316, the metadata builder engine invokes alert builder 128 to create alert business processes 42 based on application representation 132 and subscription data 146. The alert business processes are used at run-time to invoke alert business service 44 to generate appropriate data-change alerts 38 in response to data-change trigger events defined by the alert business processes. In one embodiment, the alert business processes operate in a manner similar to a database trigger, wherein one or more predefined operations are performed in response to a triggering event defined by one of the alert business processes. However, in contrast to a database trigger, the alert business processes operate in the middleware layer, and therefore do not require changes to the database schema (In most RDBMS databases, triggers are considered part of the schema rather than add-on components.) Furthermore, the architecture disclosed herein performs its operations in a manner that is transparent to the normal operations of the data system.

The process is completed in a block 318, wherein selected alert business processes are imported (i.e., loaded) into the object manager. In one embodiment, three separate alert business processes (and corresponding files), respectively corresponding to insert, update, and delete event triggers, are created for each alert-enabled view in the application. In one embodiment, the alert business processes are written in a matter corresponding to a Siebel® enterprise data system software component, and may be selectably loaded using Siebel® tools. By selecting which alert business process files to import, the administrator can choose what type of data-change alert support is provided. For instance, the administrator may not want to provide data-change alerts corresponding to the insertion of new data (i.e., insert events). Accordingly, the administrator will not load the alert business process files corresponding to insert events.

Figure 13:
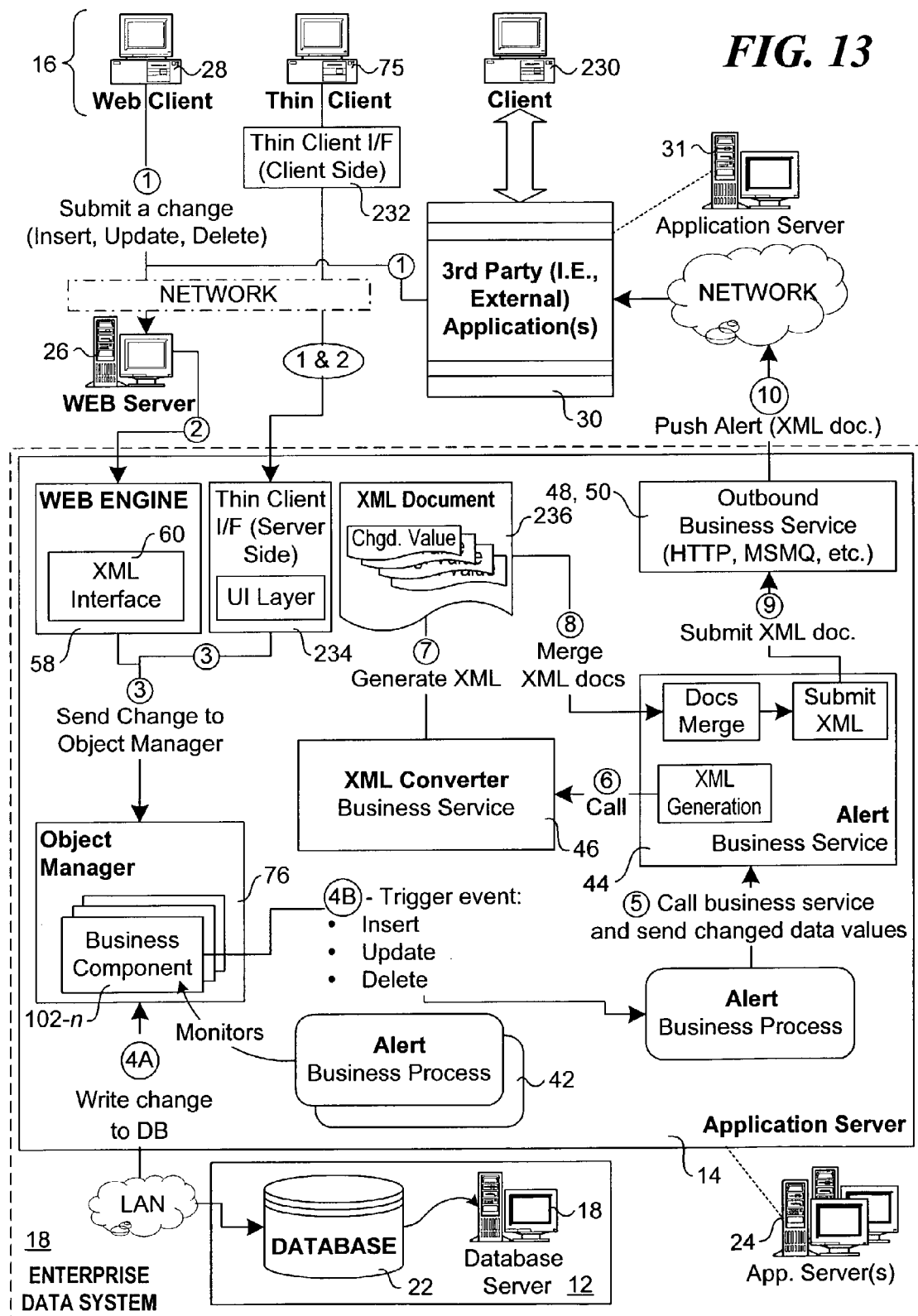
FIG. 13 is a combination block schematic diagram and flow diagram illustrating further details of the distribute software architecture of FIG. 1 and illustrating various operations performed by software components of the software architecture in response to a data-change event.

With reference to FIG. 13, the following operations are performed in response to data system data changes corresponding to UI objects that are alert-enabled. First a user of either Web client 28, thin client 75, or third-party application 30 (via a third-party application client 230) submits a data change to enterprise data system 18. In the case of the Web client, the change is submitted to Web engine 58 via Web server 26, as illustrated by respective paths 1 and 2. In the case of third-party application client 230, the change is submitted via mobile connector 46 (see FIG. 1). For thin clients 75, the change is made through use of a client-side thin client interface 232 and a corresponding server-side thin client interface 234.

In general, the data change will correspond to either an insert, update, or a delete event. As shown by paths 3, the change is submitted to object manager 76. Upon receiving the change, the object manager submits the change to database 22 via an appropriate business component. At substantially the same time, an applicable trigger event will be generated if the change corresponds to an alert-enabled UI object, as defined by that UI object's corresponding alert business process. In one embodiment, alert business processes 42 monitor business components 102-$n$ to determine whether the data change results in any changes to any alert-enabled fields, whereby such conditions may be detected by monitoring changes to the business components' fields.

In response to a triggering event, an appropriate alert business process calls alert business service 44 and sends data values corresponding to the change to the business service. As discussed above, the data change may correspond to an insert, update, or delete event. In the case of an insert event, new data corresponding to multiple fields are entered into database 22. Accordingly, the data values sent to alert business service 44 comprise the various new values for these fields. In the case of a delete event, the values pertaining to various fields for a given object (e.g., row in a list form) are deleted. Accordingly, the data values sent to the alert business service comprise the various deleted values. In the case of an update event, data pertaining to one or more fields may be changed. In this instance, in one embodiment, only those values pertaining to the fields that have changed (both the old and new values) are sent to alert business service 44. In another embodiment, all of the values pertaining to the fields' parent object (e.g., values pertaining to all of the fields of an applet that includes the changed fields) are sent to the alert business service.

Upon being called and receiving the changed data values, the alert business service calls XML converter 46 to convert the values into an XML document 236. If applicable, multiple XML documents are then merged into a single XML document. The XML document is then submitted to HTTP outbound business service 48 or outbound messaging service 50. In general, outbound messaging service 50 comprises a standard messaging service, such as the messaging services provided by Microsoft (MSMQ), IBM, and various other platform OS vendors. The outbound business service then "pushes" the alert in the form of the XML document to third-party application 30. The third-party application may then parse the XML document to extract the data-change values.

Another aspect of the architecture concerns a configuration mechanism that enables administrators and the like to define configuration parameters for a particular implementation. For example, such configuration parameters may pertain to data-change alert destinations, workflow definitions, and other implementation parameters. In one embodiment, the configuration mechanism is based on a configuration file containing a plurality of sections and key-value pairs. Each section pertains to a particular object, which is followed by one or more key-value pairs that correspond to the parameters defined for that object.

In connection with the configuration file is a user-interface by which an administrator may define configurable objects and their respective parameters. For instance, an exemplary configuration file user interface 250 is shown in FIG. 14. Configuration file UI 250 includes is divided into sections that map to corresponding sections in the configuration file. Each section includes a section header corresponding to a respective object for which configuration parameters are defined. A section header edit box 252 is provided for entry of data identifying the object being configured. Following the section header edit box is a set of key value parameters that are respectively entered via key edit boxes 254*n* and value edit boxes 256*n*.

An exemplary set of configuration information used for defining a queue (i.e., destination) to which data-change alerts are pushed is shown at the top of configuration file UI 250. The configuration object, "EAI MSMQ Transport," is entered in edit box 252*a*. The first key-value pair shown in edit boxes 254*a* and 256*a*, "MsmqPhysicalQueueNAME" and "private$\jayates1," is used to specify the name of the destination queue. The second key-value pair shown in edit boxes 254*b* and 256*b*, "MsmqQueueMachineName" and "jsriniva04," is used to specify the machine (e.g., server) that hosts the queue.

Figure 15:
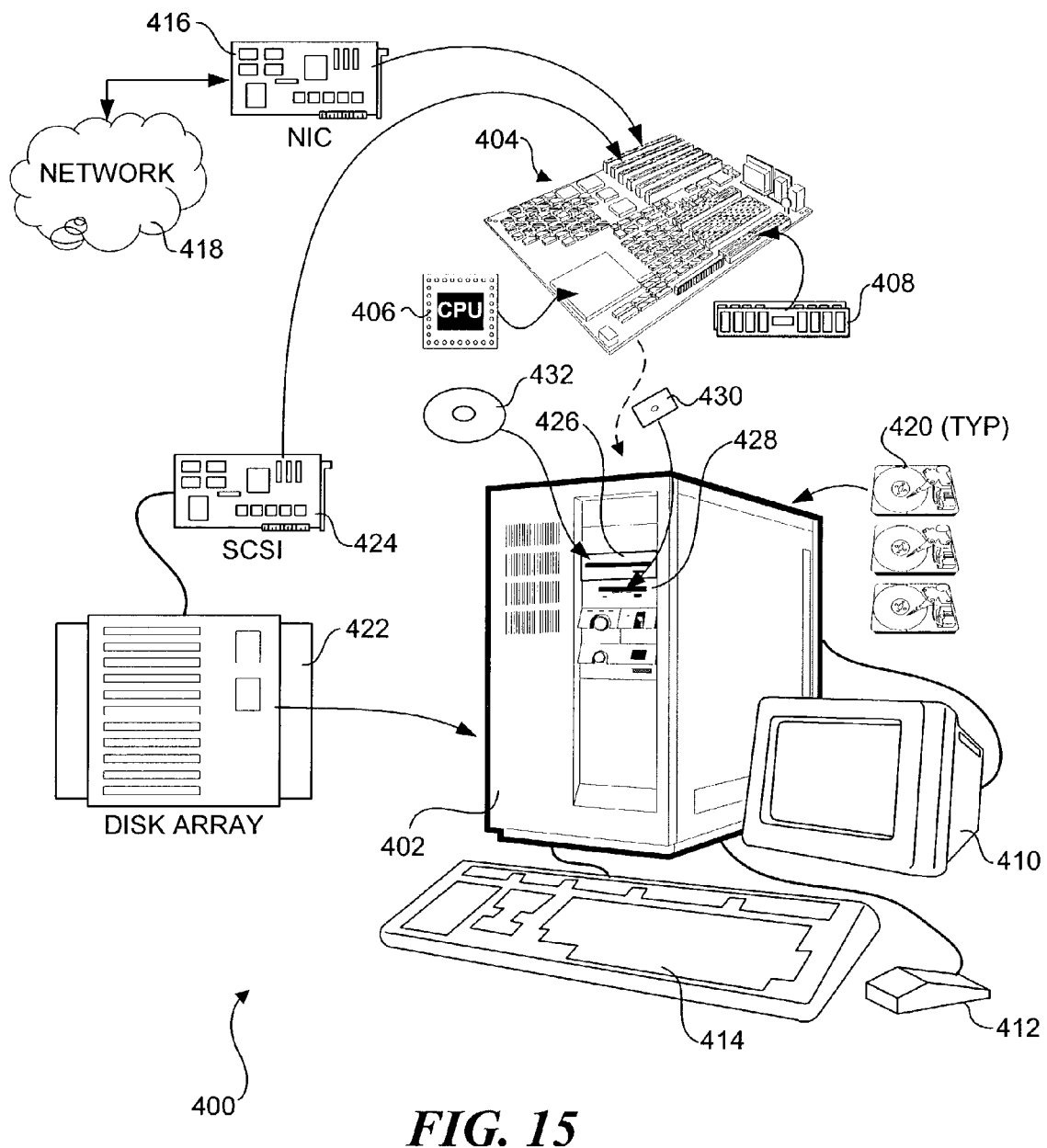
FIG. 15 is a schematic diagram illustrating various components of an exemplary computer server system that may be used for the various computer servers in distributed software architectures of FIGS. 1 and 13.

The next section of configuration file UI 250 pertains to data-change alert workflow parameters, as defined by the "SMC Alert" value entered in edit box 252*b*. In this section, each key-value pair corresponds to a workflow identifier (e.g., name) and a corresponding XML document containing instructions for performing that workflow. For example, edit boxes 254*d* and 256*d* respectively contain a workflow name of "WorkflowDelete" and a value of "SMCAlert-Delete.xml," which defines configuration parameters that indicate that the SMCAlert-Delete.xml document is used for the workflow for data-change alerts relating to deleted data.
Exemplary Computer Server for Use with Embodiments of the Invention With reference to FIG. 15, a generally conventional computer server 400 is illustrated, which is suitable for use in connection with practicing the present invention. For example, computer server 400 may be used for running the application server software modules and components discussed above, such as metadata builder 40, alert business processes 42, object manager 76, Web engine 58, and alert business service 44, etc. The same or preferably a separate computer server of similar architecture may be used to host database 22. Similarly, the same or a separate computer server of similar architecture may be used for Web server 26. Examples of computer systems that may be suitable for these purposes include stand-alone and enterprise-class servers operating UNIX-based and LINUX-based operating systems, as well as servers running the Windows NT or Windows 2000 Server operating systems.

Computer server 400 includes a chassis 402 in which is mounted a motherboard 404 populated with appropriate integrated circuits, including one or more processors 406 and memory (e.g., DIMMs or SIMMs) 408, as is generally well known to those of ordinary skill in the art. A monitor 410 is included for displaying graphics and text generated by software programs and program modules that are run by the computer server. A mouse 412 (or other pointing device) may be connected to a serial port (or to a bus port or USB port) on the rear of chassis 402, and signals from mouse 412 are conveyed to the motherboard to control a cursor on the display and to select text, menu options, and graphic components displayed on monitor 410 by software programs and modules executing on the computer. In addition, a keyboard 414 is coupled to the motherboard for user entry of text and commands that affect the running of software programs executing on the computer. Computer server 400 also includes a network interface card (NIC) 416, or equivalent circuitry built into the motherboard to enable the server to send and receive data via a network 418.

File system storage corresponding to the invention may be implemented via a plurality of hard disks 420 that are stored internally within chassis 402, and/or via a plurality of hard disks that are stored in an external disk array 422 that may be accessed via a SCSI card 424 or equivalent SCSI circuitry built into the motherboard. Optionally, disk array 422 may be accessed using a Fibre Channel link using an appropriate Fibre Channel interface card (not shown) or built-in circuitry.

Computer server 400 generally may include a compact disk-read only memory (CD-ROM) drive 426 into which a CD-ROM disk may be inserted so that executable files and data on the disk can be read for transfer into memory 408 and/or into storage on hard disk 420. Similarly, a floppy drive 428 may be provided for such purposes. Other mass memory storage devices such as an optical recorded medium or DVD drive may also be included. The machine instructions comprising the software components that cause processor(s) 406 to implement the operations of the present invention that have been discussed above will typically be distributed on floppy disks 430 or CD-ROMs 432 (or other memory media) and stored in one or more hard disks 420 until loaded into memory 408 for execution by processor(s) 406. Optionally, the machine instructions may be loaded via network 418 as a carrier wave file.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
receiving, at an enterprise data system comprising a data storage system, a selection of one or more user interface (UI) objects, wherein
data identifying the one or more selected UI objects is received from a data system application of a first type,
the one or more UI objects correspond to elements of an application user interface that a data system application of a second type is configured to display during operation,
data system applications of the second type are designed with a capability to be updated in response to data change events in the data storage system via database triggers or existing middleware logic,
data system applications of the first type require updating in response to data change events in the data storage system, but are not designed with a capability to be updated in response to data change events via the database triggers or the existing middleware logic,
each of the application of the first type and the application of the second type is configured to access and use data stored in the data storage system,
the application of the first type and application of the second type are configured to share the data stored in the data storage system, and
the one or more UI objects are selected from an alert subscription UI presented by the application of the first type;
storing metadata corresponding to the application of the second type, wherein
the metadata comprises object definitions for the plurality of UI objects including a hierarchical position of each of the plurality of UI objects;
processing the metadata to build an application representation comprising an internal representation of the application of the second type, including data identifying the hierarchical position of the each of the plurality of UI objects;
alert-enabling the one or more UI objects;
receiving, from the application of the first type, a selection of the application of the second type, wherein
the selection of the application of the second type is made from among multiple applications of the second type, and
the selection of the application of the second type is made through the alert subscription UI;
extracting, from a repository file, the metadata corresponding to the application of the second type;
in response to receiving the selection of the one or more UI objects, creating subscription data identifying the one or more UI objects;
creating one or more alert business processes corresponding to the application representation and the subscription data identifying the one or more UI objects;
creating one or more alert business processes corresponding to the application representation and the subscription data, wherein the alert business processes are configured to
define data-change trigger events, and
generate data-change alerts in response to the data-change trigger events;
receiving a data change submission from a user of the enterprise data system, at the enterprise data system;
implementing, in the data storage system, a data change corresponding to the data change submission;
determining whether the data change corresponding to the data change submission affects at least one of the one or more UI objects; and
if the data change affects at least one of the one or more UI objects, alerting the application of the first type of the data change, wherein
the alerting comprises pushing a data-change alert comprising one or more data-change values to the application of the first type, and
the data-change alert is configured to allow extraction of the one or more data-change values by the application of the first type.

2. The method of claim 1, wherein the determining comprises:
in response to receiving the data change submission, automatically monitoring for changes to alert-enabled fields corresponding to the one or more UI objects.

3. The method of claim 2, wherein the alert-enabled fields are associated with business components that are executed in an application server tier of an n-tier distributed software architecture.

4. The method of claim 1, wherein the data-change alert comprises an eXtended Markup Language (XML) document.

5. The method of claim 1, wherein the application of the first type is alerted in response to the data being changed by a user of the application of the first type.

6. The method of claim 1, wherein the one or more UI objects include objects pertaining to screens, views, applets, columns, and fields in the user interface that the application of the second type is configured to display during operation.

7. The method of claim 1, wherein
the data-change alert is sent in response to a data update event, and
the data-change alert comprises before update data and after update data corresponding to applicable one or more UI objects.

8. The method of claim 1, wherein
the data-change alert is sent in response to a data deletion event, and the data-change alert comprises data that existed prior to being deleted by the data deletion event corresponding to applicable one or more UI objects.

9. The method of claim 1, wherein
the data-change alert is sent in response to a data insert event, and
the data-change alert comprises data inserted in connection with entry of new data corresponding to applicable one or more UI objects.

10. The method of claim 1, wherein the receiving, the alert-enabling, and the alerting are performed in a manner that is transparent to normal data processing system operations.

11. The method of claim 1, further comprising:
enabling a user of the application of the first type to specify a destination to which data-change alerts are sent.

12. The method of claim 1, wherein the application of the first type is external to the enterprise data system.

13. The method of claim 1, wherein the application of the first type comprises an application developed by an entity other than the vendor of the enterprise data system.

14. The method of claim 1, further comprising:
translating metadata corresponding to the application user interface into data corresponding to the alert subscription user interface, wherein the alert subscription user interface comprises
icons corresponding to UI objects associated with specific features of the application user interface, and
a user entry area associated with each icon, wherein the user entry area is configured to accept a selection of the corresponding UI object.

15. The method of claim 1, wherein a plurality of applications of the second type are configured to share the data stored in the data storage system.

16. A method comprising:
providing to an alert subscription user interface (UI) indicia pertaining to a plurality of user interface (UI) objects, wherein
the plurality of UI objects correspond to elements of an application user interface that a data system application of a second type is configured to display during operation,
an enterprise data system comprises a data storage system, the application of the second type and a data system application of a first type are configured to access and use data stored in the data storage system
the application of the second type and the application of the first type are configured to share the data stored in the data storage system,
the indicia are adapted to be presented by the alert subscription UI as a hierarchical tree corresponding to a hierarchical relationship of the plurality of UI objects corresponding to elements of the application user interface displayed by the application of the second type during operation,
the alert subscription UI is further configured to be presented by the application of the first type,
data system applications of the second type are designed with a capability to be updated in response to data change events in the data storage system via database triggers or existing middleware logic, and
data system applications of the first type require updating in response to data change events but are not designed with a capability to be alerted to data change events via the database triggers or the existing middleware logic;
storing metadata corresponding to the application of the second type, wherein
the metadata comprises object definitions for the plurality of UI objects including a hierarchical position of each of the plurality of UI objects;
processing the metadata to build an application representation comprising an internal representation of the application of the second type, including data identifying the hierarchical position of the each of the plurality of UI objects;
rendering the hierarchical tree to provide a visual representation of the application representation;
receiving a selection of the one or more UI objects from the application of the first type;
alert-enabling the one or more UI objects;
receiving, from the application of the first type, a selection of the application of the second type, wherein
the selection of the application of the second type is made from among multiple applications of the second type, and
the selection of the application of the second type is made through the alert subscription UI;
extracting, from a repository file, the metadata corresponding to the application of the second type;
in response to receiving the selection of the one or more UI objects, creating subscription data identifying the one or more UI objects;
creating one or more alert business processes corresponding to the application representation and the subscription data, wherein the alert business processes are configured to
define data-change trigger events, and
generate data-change alerts in response to the data-change trigger events;
receiving a data change submission from a user of the enterprise data system, at the enterprise data system;
implementing, in the data storage system, a data change corresponding to the data change submission;
determining whether the data change corresponding to the data change submission affects at least one of the one or more UI objects; and
if the data change affects at least one of the one or more UI objects, alerting the application of the first type of the data change, wherein
the alerting comprises pushing a data-change alert comprising one or more data-change values to the application of the first type, and
the data-change alert is configured to allow extraction of the one or more data-change values by the application of the first type.

17. The method of claim 16, wherein selected levels in the hierarchical tree may be expanded or collapsed in response to a user input.

18. The method of claim 16, wherein the application representation comprises an XML tree, further comprising:
sending the XML tree to a browser operating on a client machine that is linked in communication with the enterprise data system; and
rendering the hierarchical tree via the browser.

19. The method of claim 16, wherein the alert subscription UI is generated by:
building an application representation comprising an internal representation of the application of the second type, including data identifying a hierarchical position of each of the plurality of UI objects; and
rendering the alert subscription UI based on data extracted from the application representation.

20. The method of claim 19, wherein
the alert subscription UI that is rendered is included as part of the application of the first type, and
the alert subscription UI is generated based on the application representation passed from the data processing system to the application of the first type.

21. The method of claim 16, wherein:
the data system applications of the first type are third-party applications;
the alert subscription UI is configured to allow the one or more UI objects to be selected;
the alert-enabling facilitates monitoring the enterprise data system for data change events;
the pushing of the data change alert comprises using a message queuing service or a Hypertext Transport Protocol (HTTP) service;
the one or more alert business processes operate in a middleware layer of the enterprise data system;
the one or more alert business processes do not require changes to a database scheme of the data storage system; and
the data-change alert comprises an XML document.

22. A non-transitory machine readable medium having instructions stored thereon, which when executed by a processor perform the method comprising:
generating data by which an alert subscription user interface (UI) may be rendered to enable a selection of one or more UI objects by a data system application of a first type, wherein
the alert subscription UI comprises a plurality of indicia pertaining to a plurality of UI objects,
the plurality of UI objects correspond to elements of an application user interface that a data system application of a second type is configured to display during operation,
the indicia pertaining to the plurality of UI objects are adapted to be presented as a hierarchical tree corresponding to a hierarchical relationship of the plurality of UI objects corresponding to elements of the application user interface displayed by the data system application for the second type during operation;
the alert subscription UI is configured to enable the selection of the one or more UI objects by marking the indicia corresponding to the one or more UI objects,
the one or more UI objects are selected from the plurality of UI objects,
an enterprise data system includes a plurality of data system applications of the second type,
the enterprise data system comprises a data storage system,
the application of the second type and the application of the first type are configured to access and use data stored in the data storage system,
the application of the second type and the application of the first type are configured to share the data stored in the data storage system,
the alert subscription UI is configured to be presented by the application of the first type,
data system applications of the second type are designed with a capability to be updated in response to data change events in the data storage system via database triggers or existing middleware logic, and
data system applications of the first type are third-party applications that require updating in response to data change events but are not designed with a capability to be updated in response to data change events via the database triggers or the existing middleware logic;
storing metadata corresponding to the application of the second type, wherein
the metadata comprises object definitions for the plurality of UI objects including a hierarchical position of each of the plurality of UI objects;
processing the metadata to build an application representation comprising an internal representation of the application of the second type, including data identifying the hierarchical position of the each of the plurality of UI objects;
rendering the hierarchical tree to provide a visual representation of the application representation;
receiving a selection of the one or more UI objects from the application of the first type;
alert-enabling the one or more UI objects;
receiving, from the application of the first type, a selection of the application of the second type, wherein
the selection of the application of the second type is made from among multiple applications of the second type, and
the selection of the application of the second type is made through the alert subscription UI;
extracting, from a repository file, the metadata corresponding to the application of the second type;
in response to receiving the selection of the one or more UI objects, creating subscription data identifying the one or more UI objects;
creating one or more alert business processes corresponding to the application representation and the subscription data, wherein the alert business processes are configured to
define data-change trigger events, and
generate data-change alerts in response to the data-change trigger events;
receiving a data change submission from a user of the enterprise data system, at the enterprise data system;
implementing, in the data storage system, a data change corresponding to the data change submission;
determining whether the data change corresponding to the data change submission affects at least one of the one or more UI objects; and
if the data change affects at least one of the one or more UI objects, generating a data-change alert and submitting the data-change alert to be sent to the application of the first type, wherein
the data-change alert comprises one or more data-change values corresponding to at least one of the one or more UI objects, and
the data-change alert is configured to allow extraction of the one or more data-change values by the application of the first type.

23. The non-transitory machine-readable medium of claim 22, wherein selected levels in the hierarchical tree may be expanded or collapsed in response to a user input.

24. The non-transitory machine-readable medium of claim 22, wherein the application representation comprises an XML tree, and execution of the instructions further performs the method comprising:
generating Web-content based on the XML, tree; and
sending the Web-content to a browser operating on a client machine that is linked in communication with the data processing system to enable the hierarchical tree to be rendered by the browser.

25. The non-transitory machine-readable medium of claim 22, wherein the application representation comprises an XML tree, and execution of the instructions further performs the method comprising:
   sending the XML tree to the application of the first type to be rendered by that application to generate the alert subscription UI.

* * * * *

UNITED STATES PATENT AND TRADEMARK OFFICE
CERTIFICATE OF CORRECTION

PATENT NO. : 9,448,860 B2  Page 1 of 1
APPLICATION NO. : 10/394280
DATED : September 20, 2016
INVENTOR(S) : Lee et al.

It is certified that error appears in the above-identified patent and that said Letters Patent is hereby corrected as shown below:

In the Specification

In Column 10, Line 16, delete "Siebel®)" and insert -- Siebel® --, therefor.

In the Claims

In Column 18, Line 63, in Claim 24, delete "XML," and insert -- XML --, therefor.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*